United States Patent
Piirainen

(10) Patent No.: US 6,473,594 B1
(45) Date of Patent: Oct. 29, 2002

(54) ADAPTIVE COMPENSATION OF DOPPLER SHIFT IN A MOBILE COMMUNICATION SYSTEM

(75) Inventor: Olli Piirainen, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,707

(22) PCT Filed: Feb. 4, 1997

(86) PCT No.: PCT/EP97/00489

§ 371 (c)(1),
(2), (4) Date: Oct. 2, 1998

(87) PCT Pub. No.: WO98/34358

PCT Pub. Date: Aug. 6, 1998

(51) Int. Cl.[7] .............................. H04Q 7/20; H04Q 7/34
(52) U.S. Cl. ....................... 455/63; 455/67.6; 455/67.3; 455/69; 342/104; 342/114
(58) Field of Search ............................... 455/12.1, 422, 455/550, 561, 441, 135, 139, 226.3, 277.2, 278.1, 67.6, 63, 517, 67.3, 69, 501, 504; 342/104, 114; 375/335

(56) References Cited

U.S. PATENT DOCUMENTS

| | | | |
|---|---|---|---|
| 3,991,372 A | 11/1976 | Sassler | 325/435 |
| 5,052,024 A | 9/1991 | Moran, III et al. | 375/7 |
| 5,471,648 A * | 11/1995 | Gourgue | 455/296 |
| 5,513,221 A * | 4/1996 | Parr et al. | 455/422 |
| 5,729,558 A * | 3/1998 | Mobin | 375/335 |
| 5,884,178 A * | 3/1999 | Ericsson et al. | 455/441 |
| 6,006,110 A * | 12/1999 | Raleigh | 455/561 |

FOREIGN PATENT DOCUMENTS

| | | |
|---|---|---|
| AU | 41627/93 | 1/1994 |
| EP | 0731587 A2 | 9/1996 |
| WO | WO 97/08841 | 3/1997 |

OTHER PUBLICATIONS

PCT International Search Report.

* cited by examiner

Primary Examiner—William Trost
Assistant Examiner—Keith Ferguson
(74) Attorney, Agent, or Firm—Perman & Green, LLP

(57) ABSTRACT

In a mobile communication system, signals which are transmitted from mobile stations moving relative to a base station are subject to a Doppler effect. A technique is described for compensating for that Doppler effect in the received signal, depending on the channel conditions for the received signal. Thus, the Doppler shift compensation is implemented only or mainly in good enough channel conditions.

10 Claims, 2 Drawing Sheets

ADAPTIVE COMPENSATION OF DOPPLER SHIFT IN A MOBILE COMMUNICATION SYSTEM

BACKGROUND OF THE INVENTION

1. Field of the Invention

The present invention relates to compensation of Doppler shift in a mobile communication station.

2. Description of the Related Art

In a mobile communication system, signals which are transmitted from mobile stations moving relative to a base station are subject to the well-known Doppler effect, which causes a frequency shift in the frequency received at the base station relative to that which was transmitted by the mobile station. This frequency shift is referred to herein as the Doppler shift. The Doppler shift is dependent upon the speed and direction of movement of the mobile station relative to the base station. Thus, the Doppler effect can provide an increase or a decrease in the frequency, depending on the direction of movement of the mobile station relative to the base station. The magnitude of the Doppler shift is dependent on the speed with which the mobile station is moving relative to the base station.

Existing mobile communication installations provide a form of Doppler compensation, in that the frequency detection circuitry within the base station which selects a particular signal on a particular channel can take into account a certain amount of Doppler shift in the signal.

According to these known techniques, the Doppler shift is estimated from samples of the received signal. The estimate for Doppler shift is thus dependent on channel quality, and typically gets worse when the channel quality is poor and better as the channel quality improves. When there is no Doppler shift and the channel conditions are near the sensitivity level of a receiver, the application of a Doppler compensation algorithm degrades the performance of the receiver.

On the other hand, if there is a Doppler shift in poor channel conditions near the sensitivity level of the receiver, the receiver is not able to meet the reference sensitivity limits if a Doppler compensation algorithm is implemented.

SUMMARY OF THE INVENTION

According to one aspect of the present invention there is provided a method for compensating for Doppler shift in a signal transmitted between a mobile station and a base station in a mobile communication system, the method comprising:

detecting the quality of the received signal; and implementing a Doppler shift compensation in dependence on the detected signal quality.

The step of detecting signal quality can include estimating the noise energy component of the signal. This can either be used itself to generate a Doppler correction modification factor for controlling the Doppler shift compensation in dependence on the detected signal quality, or to generate a signal to noise ratio for the received signal, which would then be used to generate the Doppler correction modification factor.

The Doppler compensation can be implemented as any appropriate user defined function of signal quality. For example, it could be a linear function or a step function.

According to the present invention, the above described problem is overcome, because Doppler shift compensation is used only or mainly in good enough channel conditions. This provides an increase in performance for the receiver. Thus, the technique is provided for ensuring that Doppler compensation does not degrade the sensitivity of the receiver.

In the described embodiment, the adaptive method for Doppler correction applied to a GSM system first estimates the quality of the channel and uses the resulting modification factor to scale a calculated phase error between a reference signal and the actual received signal.

A particularly useful Doppler shift compensation technique for fast moving mobile stations is implemented by the following steps:

determining a channel impulse response for the channel on which the signal is received;

using the channel impulse response to estimate data bits of a selected portion of the received signal;

generating a reference vector using the channel impulse response and the estimated bits;

determining a Doppler characteristic using the reference vector and the selected portion of the received signal; and using the Doppler characteristic to provide a Doppler shift compensation for the received signal.

According to another aspect of the present invention there is provided a system for compensating for Doppler shift in a signal transmitted between a mobile station and a base station in a mobile communication system, the system comprising:

circuitry for detecting the quality of the received signal; and circuitry for implementing a Doppler shift compensation in dependence on the detected signal quality.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE INVENTION

Figure 1:
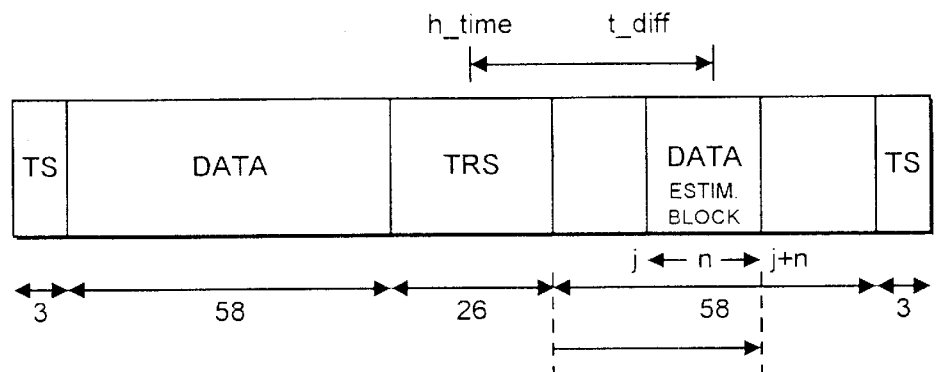
FIG. 1 is a diagram of a signal burst in a mobile communication system.

FIG. 1 illustrates a normal burst in a mobile communication system according to the GSM standard. This figure represents a burst received at a base station. For a TDMA system according to the GSM standard, mobile stations transmit these bursts as modulated signals on frequency channels allocated by a base station controller. One frequency channel may support up to eight bursts, each burst associated with a respective call, where each call is allocated a time slot in which to send the burst. Further details of a TDMA system according to the GSM standard are not described herein because they are known to a person skilled in the art.

The normal burst contains two packets of 58 bits (DATA) surrounding a training sequence (TRS) of 26 bits. Three tail bits (TS) are added at each end of the normal burst. The training sequence (TRS) is a predetermined sequence of bits which is sent by the mobile station (MS) and is known at the base station controller (BSC). It is utilized at the base station controller to estimate the impulse response of the channel over which the burst is sent. The actual information which is transmitted is located in the data bits (DATA) of the burst.

As explained earlier, the environment through which a signal passes from a mobile station to a base station can vary considerably, depending, amongst other things, on the distance between the mobile station and the base station, and interference caused by buildings and other structures in the area. As a result, the signal strength and signal quality of the signal received at the base station varies widely. Moreover, for moving mobile stations, the signal received by the base station is subject to a Doppler shift which should be corrected.

The circuit described herein provides a Doppler shift correction only in situations where the channel conditions are good enough to give adequate signal quality received at the base station. Thus, a modification factor Sc is generated dependent on signal quality, which is used to control the Doppler shift correction so that Doppler shift correction is applied only in good enough channel conditions.

Figure 2A:
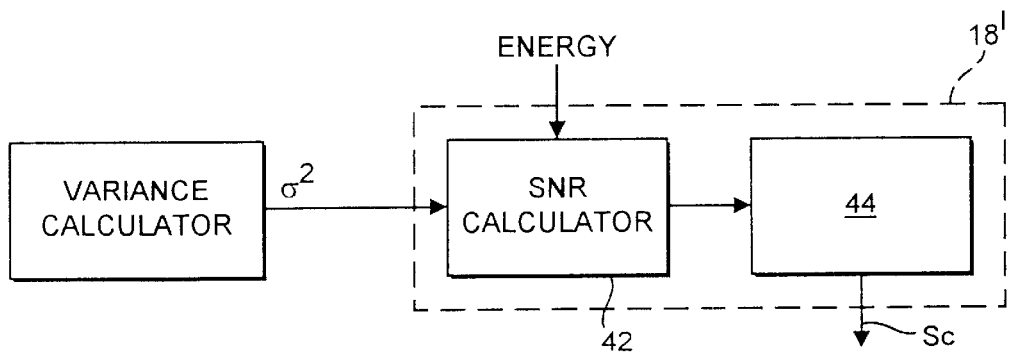
FIG. 2a is a block diagram of a revised Doppler correction modification factor generator circuit.
Figure 2:
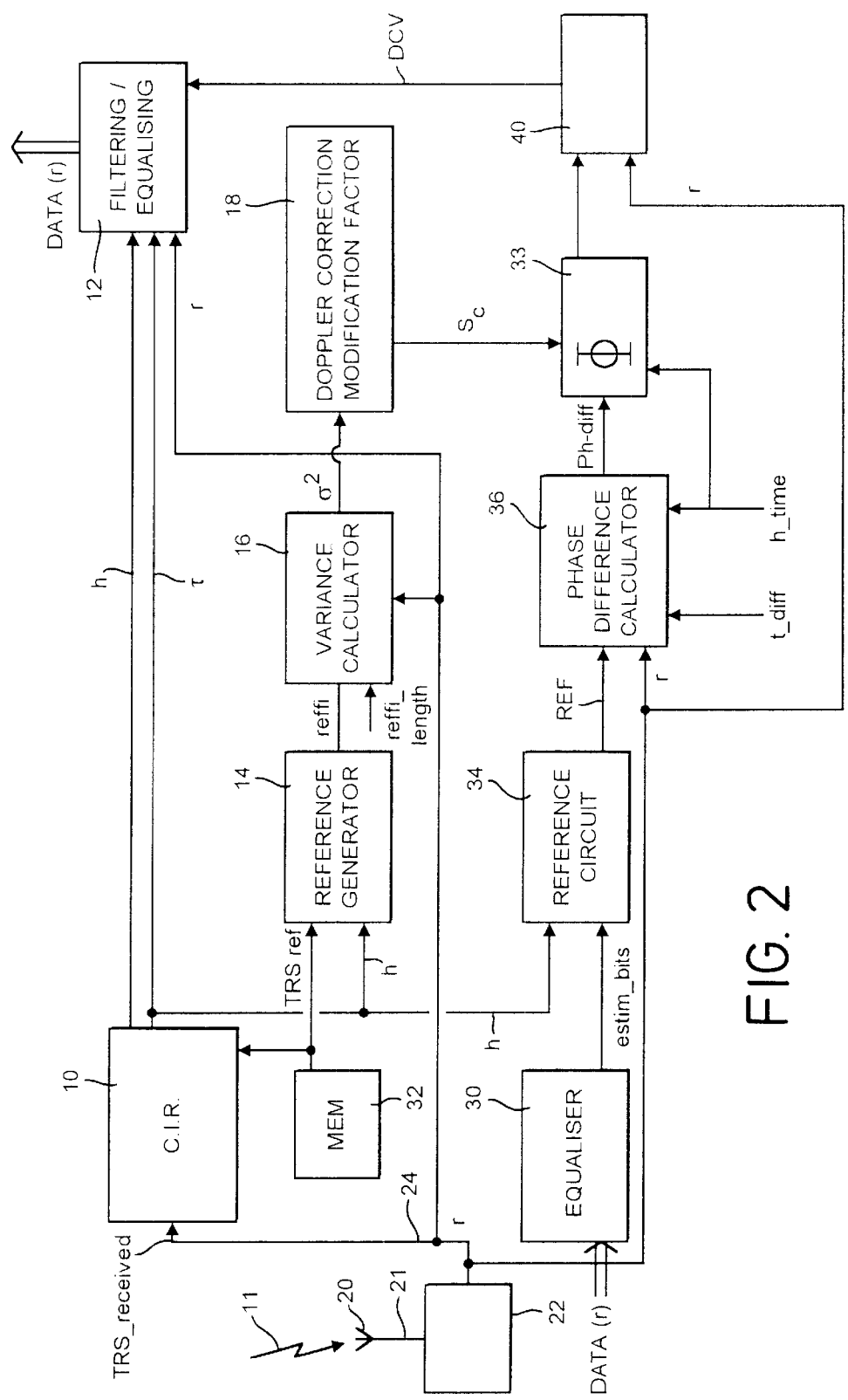
FIG. 2 is a block diagram of circuitry for implementing modified Doppler shift compensation.

FIG. 2 illustrates a circuit 1 suitable for implementing a Doppler compensation in a GSM system. It should be understood that the various blocks in FIG. 2, although illustrated as separate interconnected entities, do not necessarily represent separate physical entities, but are intended to represent diagrammatically the various steps which are carried out. The blocks could be implemented as circuits or a suitably programmed microprocessor may effect each of the functions which is individually assigned to the blocks.

An antenna 20 receives signals 11 from the mobile stations. The antenna 20 is connected, via an interconnect 21, to RF circuitry 22. This circuitry 22 operates on the received burst to downshift the frequency to the baseband frequency and to sample the burst to provide from the analogue signal digital sampled values. The output of RF circuitry 22 is a sampled burst r (in digital form), sampled at the expected bit rate of the transmitted signal. FIG. 1 illustrates such a burst. The output of circuitry 22 is supplied along line 24 to a channel impulse response (C.I.R.) block 10, to a variance calculator 16 to enable estimation of the quality of the communication channel (as described later), to filtering and equalisation circuitry 12, to a phase difference calculator 36 and to transforming circuitry 40 to enable the estimation and application of a Doppler shift correction to the burst r.

The top part of FIG. 2 illustrates the circuitry required for implementing the adaptive part of the system, to generate the Doppler correction modification factor $S_c$. A memory 32 holds the training sequence TRSref which is the predetermined sequence of bits which is sent by the mobile station MS as a training sequence and received at the base station as TRS_received. The reference training sequence TRSref is supplied to a reference generator 14 and to the channel impulse response (C.I.R.) block 10. The reference generator 14 also receives the estimated channel impulse response h from the channel impulse response block 10.

The C.I.R. block 10 receives the burst r, including the received training sequence TRS_received and calculates an estimated channel impulse response h by calculating the cross correlation between the received training sequence TRSreceived and the known training sequence TRSref.So, $$h = \text{xcorr (TRS\_received, TRSref)} \quad \text{(equation 1)}$$

It will be appreciated that, prior to effecting the cross correlation, the known training sequence TRSref, which is stored in digital form, is i,q modulated similarly to the manner in which the training sequence has been modulated at the MS for transmission, according to the GSM standard. The cross correlation is done in a known manner to produce a channel impulse response in the form of five tap values $(h(i)_{i=0\,to\,4})$.

As is known, the estimated impulse response h is used to calculate the expected estimate of the data in the received burst, as though the data has been subject to the same average noise.

The C.I.R. block also generates timing advance information τ, which is used to determine where in the allocated time slot the received burst r is located.

For each burst, the estimated channel impulse response h for that burst is calculated by the CIR block 10 and is supplied to filtering/equalizing circuitry which allows the data, DATA(r), in that burst to be recovered. As is known, the filtering/equalizing circuit 12 receives the channel impulse response h and timing information τ for the received burst to allow the signal to be demodulated, filtered and decoded, to recover the data in a known manner.

The reference generator 14 produces a reference vector, reffi, which is calculated using the convolution of the impulse response and the known training sequence. Thus, the reference generator 14 performs the following calculation:

$$\text{reffi} = h * \text{TRSref} \quad \text{(equation 2)}$$

In more detail, (where $\text{reffi}_k$ represents the kth sample of the signal reffi)

$$\text{reffi}_k = \sum_{i=0}^{N-1} h_i \cdot (1 - 2 \cdot TRS_{k-i}) \quad \text{(equation 3)}$$

in which N represents the number of tap values in the estimated impulse response h (N=5 in the described embodiment), and k runs from N−1 to 25.

The vector reffi is supplied from the reference generator to the variance calculator 16. As described above, the variance calculator also receives the burst r, including the received training sequence. The variance calculator calculates a variance var ($\sigma^2$) according to the following equation:

$$\text{var} = \frac{\left(\sum_{k=4}^{25} (|r_k - \text{reffi}_k|^{\wedge}2)\right)}{\text{reffi\_length}} \quad \text{(equation 4)}$$

The term reffi_length is a constant representing the length of the reference signal, reffi. This is calculated by multiplying the number of samples (22) by the bit separation.

In equation 4, the values of $r_k$ are the sampled values of the received training sequence for the burst r.

It will be appreciated that each actual received sample $r_k$ will have a noise level which is different to the averaged estimated noise level derived from the channel impulse response and reflected in the reference samples $\text{reffi}_k$. Thus, the variance gives an indication of the level of noise energy actually received, and thus signal quality.

The output $\sigma^2$ of the variance calculator 16 is supplied to a Doppler correction modification factor circuit 18. The Doppler correction modification factor circuit 18 uses the calculated variance $\sigma^2$ to generate a modification factor $S_c$ using a function which can be determined by a user. In the embodiment shown in FIG. 2, the Doppler correction modification factor circuit generates the modification $S_c$ as a function of the variance $\sigma^2$, for example a linear function or a non-linear function such as a step function.

In another embodiment of the invention the value of $S_c$ is calculated in dependence upon a signal to noise ratio (SNR) of the channel. FIG. 2a illustrates circuitry for a Doppler correction modification circuit 18' for implementing such an embodiment. A SNR calculator 42 receives the calculated variance $\sigma^2$ from the variance calculator 16 and an energy value E. The signal energy E may be determined from the calculated signal reffi in accordance with the following:

$$E = \sum_{k=4}^{25} \frac{|reffi_k|^2}{reffi\_length} \qquad \text{(equation 4a)}$$

Alternatively the tap values can be used to derive the signal energy, E, of the channel according to the following:

$$E = \sum_{i=0}^{4} (h(i))^2 \qquad \text{(equation 1a)}$$

The SNR value is calculated by the SNR calculator 42 in accordance with the following equation:

$$SNR = \frac{E}{\sigma^2} \qquad \text{(equation 4b)}$$

The above referenced technique is described in our earlier Application No. PCT/FI96/00461, the contents of which are herein incorporated by reference.

The SNR value is then supplied to a revised modification factor generating circuit 44. This circuit 44 calculates the value of the modification factor $S_c$ as a function of the SNR value, for example a linear function or a non-linear function such as a step function.

The lower part of the circuit in FIG. 2 illustrates in block diagram form a system for implementing a Doppler shift correction. However, it will be apparent that the Doppler correction adaptive part described above could be used with other implementations of Doppler correction.

The main function of the adaptive part of the circuit described above is to provide a Doppler correction modification factor $S_c$ which is based on the channel conditions, so that Doppler correction is used only or mainly in good enough channel conditions. This is useful in any type of Doppler correction. One example is discussed in the following.

An equalisation circuit 30, for example a Viterbi equalizer, receives the filtered, demodulated and equalized signal DATA(r) from the filtering and equalisation circuitry 12. The equalisation circuit 30 operates on a part of the data sequence DATA of the burst (that part having been derived from ESTIM.BLOCK in FIG. 1) to estimate bits from the data which was sent from the mobile station MS. This data is referred to herein as estim_bits, and they run from k=j to k=j+n. The equalisation circuit 30 operates to make decisions of the bits as in known mobile communication systems and thus it will not be described further herein.

The estimated bit decisions estim_bits are supplied to a reference circuit 34. The reference circuit 34 generates a reference vector ref by using a convolution of the estimated bit decisions and the estimated impulse response h, according to the following equation:

$$ref = estim\_bits * h \qquad \text{(equation 5)}$$

Thus, the reference vector ref comprises a set of samples $ref_k$, $k=j \rightarrow j+n$ each having real and imaginary values. The reference vector ref is supplied to a phase difference calculator 36. As described earlier, the phase difference calculator 36 also receives the received burst r. As known in the art, the received burst comprises samples $r_k$ each having real and imaginary values.

The phase difference calculator uses a value t_diff which represents the time between a zero phase offset point h_time and the middle of the estimation block, as illustrated in FIG. 1. The zero phase offset point h_time is a zero phase offset point inside the training sequence where the calculated impulse response is true. In practice, this is typically the middle of the training sequence. The value of t_diff and h_time can be determined during the design phase of the system, and a constant thereafter. Of course, they could be reprogrammed if necessary during use of the system.

In addition, the location (j) of the beginning of the estimation block estim_block and its length (n) is determined and programmed into the equalisation circuit 30. The estimation block is selected so that the Doppler offset has not yet corrupted the received bits.

The phase change per bit duration (ph_diff) resulting from the Doppler effect (the Doppler characteristic) is calculated from the reference signal ref and the actual received signal r by the phase difference calculator 36 according to one of the following equations:

$$ph\_diff = \frac{1}{t\_diff} \tan^{-1}\left\{\frac{\sum_k imag(r_k \cdot ref_k^*)}{\sum_k real(r_k \cdot ref_k^*)}\right\} \qquad \text{(equation 6)}$$

$$ph\_diff = \frac{1}{t\_diff} \sum_k \tan^{-1}\left\{\frac{imag(r_k \cdot ref_k^*)}{real(r_k \cdot ref_k^*)}\right\} \Big/ length(k) \qquad \text{(equation 7)}$$

where k runs from j to j+n, and where length (k) represents the amount of different k values in the summation, i.e. n.

A Doppler correction circuit 38 is then used to correct the estimated Doppler shift from the received samples. The Doppler correction circuit 38 receives the zero phase offset point h_time and the Doppler correction modification factor $S_c$. Furthermore, it receives the calculated phase difference from the phase difference calculator 36. Knowing that the point h_time has zero phase offset, the actual Doppler phase shift $\phi$ can be calculated for each bit as follows:

$$\phi_k = S_c \cdot ph\_diff \cdot (k - h\_time) \qquad \text{(equation 8)}$$

where k is a bit index of the received sample r. When the index k<h_time the phase shift has an opposite sign to when k>h_time.

Transforming circuitry 40 is then used to implement the Doppler shift correction on the received burst r to produce a corrected signal. The transforming circuitry receives the estimated Doppler shift vector $\phi$ (comprising the $\phi_k$ values) and sampled values of the received burst r. It performs a CORDIC operation to correct for the Doppler shift of each sample, according to the following operation.

$$\begin{pmatrix} N\_real\_sample(k) \\ N\_imag\_sample(k) \end{pmatrix} = \begin{pmatrix} \cos\phi_k & -\sin\phi_k \\ \sin\phi_k & \cos\phi_k \end{pmatrix} \begin{pmatrix} real(r_k) \\ imag(r_k) \end{pmatrix} \qquad \text{(equation 9)}$$

The Doppler shift corrected vector DCV which is output from the transforming circuitry 40 is supplied to the filtering/equalizing circuit 12, so that the Doppler corrected signal is used to recover the data from the signal.

As part of the Doppler correction technique described above, bit decisions for the estimation block have already been made. These constitute part of the data. It is thus not necessary to estimate the same bits again, although this could be done. Instead, the equalisation circuit 30 can be stopped at the end of the estimation block and the current state preserved. Next, the Doppler correction is performed for the remaining bits and the Viterbi equalisation is then executed to the end of the time slot on the Doppler corrected bits. In the second part, the Doppler correction may be done to the first part of the time slot and the Viterbi estimation can then be performed for the data in the first part of the time slot. This method reduces the required calculations in the receiver.

It is possible to implement a limit on the value of the phase difference ph_diff, so that if the phase difference is below a certain threshold, no correction is performed.

A typical environment where Doppler correction could be used is fast trains or motorways. In that situation, it is likely that there would be a line of sight path from the base station to the mobile station, so that the Doppler correction would be a constant value between different time slots if the velocity of the mobile station is the same. In that case, an average value of the phase difference could be calculated from several different time slots, and this average value could be used as a correction value.

In the case of a diversity receiver having a plurality of different branches, the phase differences can be calculated for all branches using the same estimates as the received samples, with each branch using its own impulse response.

The adaptive Doppler correction technique has been described above in relation to one particular method for Doppler correction. As already mentioned, the adaptive technique may be applied to other methods of Doppler correction. By way of an example, it could be used with the Doppler correction technique described in Australian Patent No. 664626.

What is claimed is:

1. A method for compensating for Doppler shift in a signal received at one of a mobile station and a base station in a mobile communication system, the method comprising:
    detecting the quality of the received signal and generating a modification factor based on said detected signal quality; and
    implementing a Doppler shift compensation in said received signal using said modification factor such that the Doppler shift compensation is implemented in dependence on the detected signal quality.

2. A method according to claim 1, wherein the step of detecting signal quality comprises estimating the noise energy component of the signal.

3. A method according to claim 1, wherein the step of detecting the signal quality comprises calculating a signal to noise ratio for the received signal.

4. A method according to claim 1, wherein a Doppler compensation is implemented as a linear function of the detected signal quality.

5. A method according to claim 1, wherein a Doppler compensation is implemented as a non-linear function of the detected signal quality.

6. A method according to claim 5, wherein a Doppler compensation is implemented as a step function of the detected signal quality.

7. A method for compensating for Doppler shift in a signal received at one of a mobile station and a base station in a mobile communication system, the method comprising:
    detecting the quality of the received signal and generating a modification factor based on said detected signal quality; and to him
    implementing a Doppler shift compensation in said received signal using said modification factor such that the Doppler shift compensation is implemented in dependence on the detected signal quality; and
    wherein a Doppler compensation is implemented by the following additional steps:
        determining a channel impulse response for the channel on which the signal is received;
        using the channel impulse response to estimate data bits of a selected portion of the received signal;
        generating a reference vector using the channel impulse response and the estimated bits;
        determining a Doppler characteristic using the reference vector and the selected portion of the received signal; and
        using the Doppler characteristic to provide a Doppler shift compensation for the received signal.

8. A system for compensating for Doppler shift in a signal received at one of a mobile station and a base station in a mobile communications installation, the system comprising:
    a first circuit for detecting the quality of the received signal and said first circuit including modification factor generating means for generating a modification factor based on said detected signal quality; and
    a second circuit connected to the first circuit, the second circuit to receive said modification factor and arranged to implement a Doppler shift compensation in said received signal using said modification factor so that the Doppler shift compensation is implemented in dependence on the detected signal quality.

9. A system according to claim 8, wherein the circuitry for detecting the quality of the received signal includes a variance calculator for estimating the noise energy component of the signal.

10. A system according to claim 8, wherein the circuitry for detecting the quality of the received signal includes a signal to noise ratio calculator for calculating the signal to noise ratio of the received signal.

* * * * *